United States Patent [19]

Bansal et al.

[11] Patent Number: 4,833,356

[45] Date of Patent: May 23, 1989

[54] COMPACT CONNECTIONS FOR INTERDISPERSED ARMATURE WINDING

[75] Inventors: Madan L. Bansal; William A. Byrd, both of Rockford, Ill.

[73] Assignee: Sundstrand Corporation, Rockford, Ill.

[21] Appl. No.: 138,203

[22] Filed: Dec. 28, 1987

[51] Int. Cl.[4] ................................................ H02K 3/00
[52] U.S. Cl. ...................................... 310/207; 310/71; 310/180; 310/184; 310/198
[58] Field of Search ........................... 310/71, 190–208, 310/180, 184, 195, 254, 261, 259, 264

[56] References Cited

U.S. PATENT DOCUMENTS

| | | |
|---|---|---|
| 1,832,700 | 11/1931 | Gay . |
| 2,414,571 | 1/1947 | Veinott . |
| 3,152,273 | 10/1964 | Harrington . |
| 3,325,661 | 6/1967 | Parsons ............................... 310/184 |
| 3,396,324 | 8/1968 | Karlsson .............................. 310/198 |
| 3,430,126 | 2/1969 | Richardson ......................... 310/198 |
| 3,601,642 | 8/1971 | Willyoung . |
| 3,610,784 | 10/1971 | Rundell . |
| 3,633,057 | 1/1972 | Smith et al. . |
| 3,652,888 | 3/1972 | Harrington . |
| 3,739,213 | 6/1973 | Willyoung . |
| 4,132,914 | 1/1979 | Khutortsky ......................... 310/184 |
| 4,200,817 | 4/1980 | Bratoljic . |
| 4,309,634 | 1/1982 | Koroly et al. . |
| 4,315,179 | 2/1982 | Davey . |
| 4,321,497 | 3/1982 | Long . |
| 4,363,985 | 12/1982 | Matsuda .............................. 310/184 |
| 4,394,596 | 7/1983 | Kimura ................................ 310/184 |
| 4,404,486 | 9/1983 | Keim et al. . |
| 4,451,751 | 5/1984 | Auinger . |
| 4,462,859 | 7/1984 | Nakamura . |
| 4,492,890 | 1/1985 | McDonald . |

FOREIGN PATENT DOCUMENTS

| | | |
|---|---|---|
| 2315186 | 1/1977 | France . |
| 56-6638 | 1/1981 | Japan . |
| 59-178934 | 11/1984 | Japan . |
| 1083290 | 3/1984 | U.S.S.R. ............................... 310/198 |
| 1092659 | 5/1984 | U.S.S.R. ............................... 310/184 |

Primary Examiner—R. S. Skudy
Attorney, Agent, or Firm—Wood, Dalton, Phillips, Mason & Rowe

[57] ABSTRACT

An improved alternating current machine having interdispersed armature windings is disclosed. The AC machine comprises an armature core having a plurality of generally longitudinal slots and a plurality of winding groups. Each of the winding groups comprises a plurality of one-turn coil windings which are series connected to electrically adjacent windings of the winding group. Each winding has two generally parallel side portions disposed in non-adjacent ones of the slots. The side portions are joined at one end by an end turn which extends axially outward from one end of the armature core and each of the side portions have an end connection extending a distance axially outward from the other end of the armature core for connecting to a respective electrically adjacent end connection of its electrically adjacent winding. The winding groups are interdispersed about the armature core such that there are a plurality of fixed distances between the electrically adjacent windings. The end connections extend outwardly from the armature core a plurality of distances, and the distance which each particular one of the end connections extends is proportional to the distance between the particular end connection and its electrically adjacent end connection to which it is series connected.

5 Claims, 4 Drawing Sheets

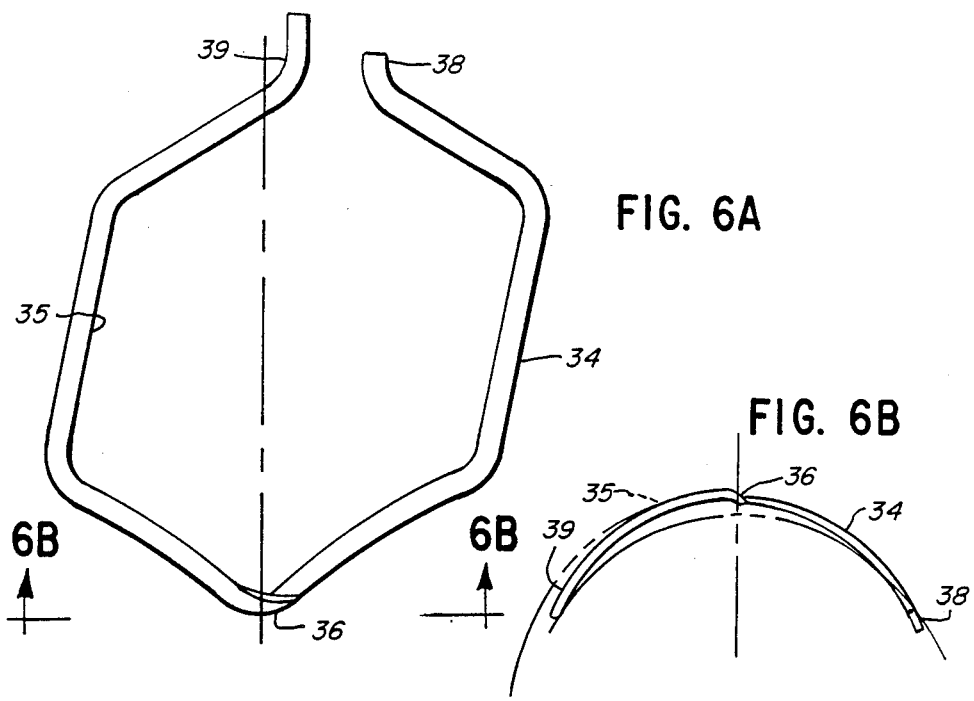
FIG. 6A
FIG. 6B
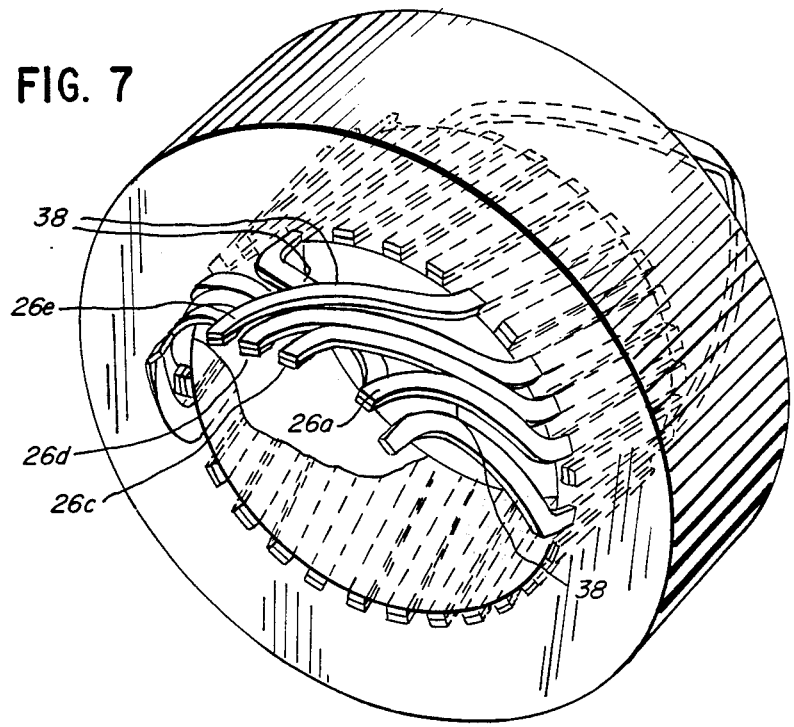
FIG. 7

COMPACT CONNECTIONS FOR INTERDISPERSED ARMATURE WINDING

FIELD OF THE INVENTION

The invention relates to alternating current machines having interdispersed armature windings, and more particularly, to a compact connection for an interdispersed armature winding providing a reduced diameter thereof.

BACKGROUND OF THE INVENTION

Interdispersion, also referred to as interspersion, of armature windings is well known in the art. See, for example, MacDonald U.S. Pat. No. 4,492,890.

In an AC generator, an interdispersed armature winding reduces unwanted harmonic components in the output voltage and, therefore, provides a more sinusoidal output waveform. In an AC motor, an interdispersed armature winding reduces unwanted harmonic components in the rotating magnetic field and, therefore, reduces internal losses and provides a more uniform speed-torque curve.

Typically an AC machine has an armature comprising a slotted armature core wrapped by an even number plurality of winding groups. In a single phase AC machine, each winding group forms a magnetic pole. Thus a two pole single phase AC machine has two winding groups, a four pole single phase AC machine has four winding groups, and so forth. In a three phase AC machine, each of the phases has the same number of winding groups, the number being an even plurality and equal to the number of magnetic poles. Thus in a two pole, three phase AC machine, each phase has two winding groups for a total of six winding groups. Similarly in a four pole, three phase AC machine, each phase has four winding groups for a total of twelve winding groups.

In one type of AC machine, each winding group comprises a plurality of one-turn coil (or hairpin) joined in series. Each coil has two generally parallel side portions which are disposed in non-adjacent slots. The side portions are joined at one end by an endturn which extends axially outward from one end of the armature core. Other and the side portions also have an end connection extending a uniform distance axially outward from the other end of the armature core for series connecting to its electrically adjacent coil of its respective winding group.

Each coil spans a uniform number of slots. However, in the case of an interdispersed armature winding, coil of one winding group are disposed in certain slots located between two adjoining coil of another winding group. Thus when the end connections of separated coil of one winding group are connected (separated connections), the end connections must span a greater number of slots than when end connections of non-separated windings are connected (non-separated connections).

In view of the fact that the end connections are of a uniform length, in order to physically make these connections, the end connections for the separated connections must be pulled radially outward so as not to interfere with the non-separated connections. Because the end connections must be pulled radially outward, the diameter of the armature winding is increased.

In many generators, devices such as current transformers or other windings are positioned on the armature. For example, Lundell-Rice generators include both stationary armature windings and stationary field coils. An increased diameter armature winding can require the field coils to be positioned longitudinally away from the armature windings, increasing the overall length of the machine.

Additionally, automation of the brazing of the windings is difficult because the connections when pulled outwardly are in unknown locations.

The invention is provided to eliminate these and other problems.

SUMMARY OF THE INVENTION

An object, therefore, of the invention is to provide an improved AC machine having an interdispersed armature winding.

The AC machine comprises an armature core having a plurality of generally longitudinal slots and a plurality of winding groups. Each of the winding groups comprises a plurality of one-turn coils which are series connected to electrically adjacent windings of the respective winding group. Each winding has two generally parallel side portions disposed in non-adjacent slots, the side portions being joined at one end by an endturn which extends axially outward from one end of the armature core, and each of the side portions has an end connection which extends a distance axially outward from the other end of the armature core for connecting to a respective electrically adjacent end connection of its electrically adjacent winding. The winding groups are interdispersed about the armature core such that there are a plurality of fixed distances between the electrically adjacent windings.

According to the invention, the end connections extend outwardly from the armature core a plurality of distances and the distance which each particular one of the end connections outwardly extends is proportional to the distance between the particular end connection and its electrically adjacent end connection.

Other features and advantages of the invention will be apparent from the following specification and the accompanying drawings.

BRIEF DESCRIPTION OF THE DRAWINGS

FIG. 6A is a side view of a one-turn coil winding;

FIG. 6B is an end view of a one-turn coil winding taken along line 6B—6B of FIG. 6A; and FIG. 7 is an isometric view of a single phase, single pole armature.

DESCRIPTION OF THE PREFERRED EMBODIMENT

Figure 1:
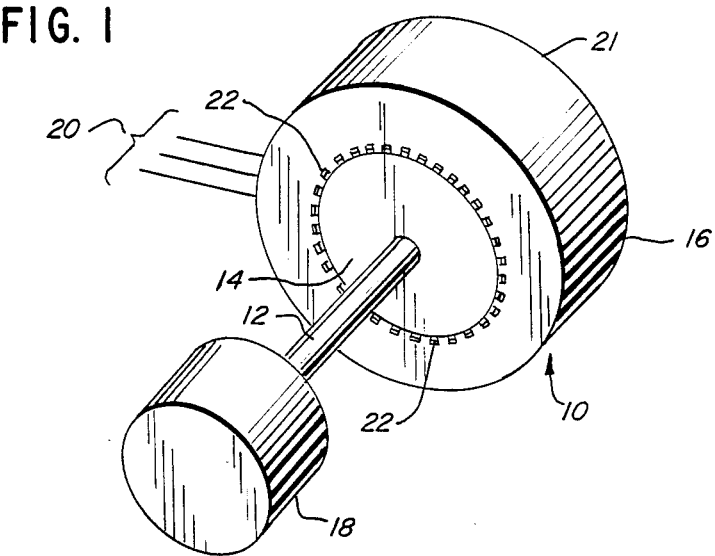
FIG. 1 is a mechanical schematic view of an alternating current machine.

An alternating current machine, generally designated 10, is illustrated in FIG. 1. The alternating current machine 10 may be, for example, a Lundell-Rice generator. The alternating current machine 10 includes a shaft 12, a rotor 14 and an armature 16. A device 18 is connected to the shaft 12. If the AC machine 10 is a generator, the device 18 is a prime mover for rotating the shaft 12 and power is developed on leads 20. If the AC machine 10 is a motor, the device 18 is a load to be rotated by the shaft 12 and power is supplied by a source (not shown) by way of the leads 20.

The armature 16 comprises an armature core 21 having a plurality of axially disposed slots 22 for receiving an armature winding (not shown). As is well known in the art, the slots 22 are radially sized to receive two radial layers of windings, one in an upper slot position and the other in a lower slot position.

Figure 2:
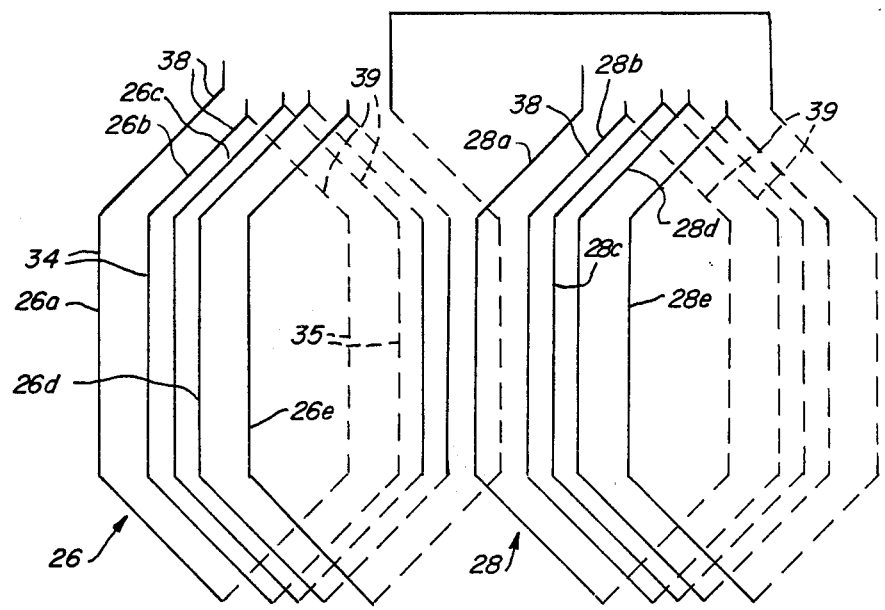
FIG. 2 is a winding schematic of a single phase, interdispersed armature winding.

A winding schematic of a single phase AC machine having a single phase interdispersed armature winding 24 is illustrated in FIG. 2. The numbers 1-30 designate particular ones of the slots 22.

The single phase winding 24 comprises first and second winding groups 26, 28 joined by an interphase jumper 30. Terminals T1 and G1 couple the armature winding 24 to the device 18, which as described above is a load if the AC machine 10 is a motor, and is a power supply or prime mover if the AC machine 10 is a generator.

The solid lines represent windings disposed in the upper slots of the armature core 21, and the dashed lines represent windings located in the lower slots thereof. The first winding group 26 comprises five wave windings 26a-26e, and the second winding group 28 comprises five wave windings 28a-28e. As can be seen, the first and fifth windings 26a and 26e of the first winding group 26 are disposed between the first and second windings 28a and 28b and the fourth and fifth windings 28d and 28e, respectively, of the second winding group 28. The first and fifth windings 28a and 28e of the second winding group 28 are disposed between the first and second 26 windings 26a and 26b and the fourth and fifth windings 26d and 26e of the first winding group 26. This overlapping of the windings is commonly referred to as "interdispersion" or "interspersion".

A more detailed explanation of interdispersed windings can be found in the MacDonald patent referred to above, the specification of which is expressly incorporated herein by reference.

A one-turn coil 32 is illustrated in FIGS. 6A and 6B. The coil 32 includes two side portions 34 and 35, an end turn 36 and two end connections 38 and 39.

The side portions 34 are each disposed in one of the slots 22. The end turn 36 extends axially beyond one end of the armature core 21. The end connections 38 extend axially beyond the other end of the armature core 21. As discussed in greater detail below, after the first and second side portions are placed in the slots, the first and second end connections 38, 39 are bent into contact with end connections of respective series adjoining coil 32 prior to final brazing.

Referring again to the schematic of FIG. 2, and specifically to the winding 26b of the first winding group 26, it can be seen that the winding has side portions 34 disposed in slot number 2 and 12. The side portion 34 disposed in slot number 2 is connected to the side portion 34 of the first winding 26a which is disposed in slot number 10. Thus, this connection must span eight (ten minus two) of the slots 22. However, the side portion 34 disposed in slot number 12 is connected to the side portion 34 of the third winding 26c which is disposed in slot number 3. Thus, this connection must span nine (twelve minus three) of the slots 22. This difference in the number of the slots 22 which the connections must span is due to the interdispersion of the windings.

According to prior art AC machines, both of the end connections 38 of all of the coil 32 were of a uniform length. Thus when one attempted to series connect the adjoining coil 32, and the connections spanned differing numbers of slots, the long span connections had to be pulled radially outward so as not interfere with the short span connections. The radially outward connection takes up additional space, causing the armature 16 to have a greater diameter. It also increases the resistance and reactance of the armature winding, reducing the efficiency of the AC machine.

Figure 3:
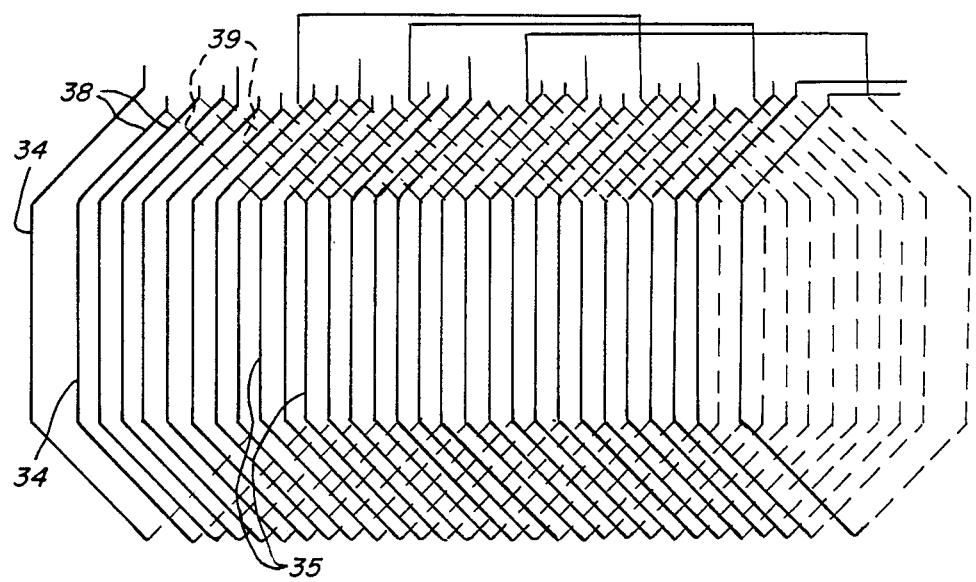
FIG. 3 is a winding schematic of a three phase, interdispersed armature winding.

A winding schematic of a two-pole (north and south magnetic poles not shown), three phase interdispersed armature winding. The arrangement of FIG. 3 is similar to that disclosed with respect to FIG. 2, but for the addition of second and third phases, as shown.

As is well known in the art, terminals T1, T2, T3, G1, G2 and G3 are coupled to the leads 20 (FIG. 1). The three-phase winding illustrated in FIG. 3 includes six winding groups wherein interphase jumpers 30 couple the first winding group of each of the three phases to its respective second winding group 28 to form respective north and south magnetic poles.

Figure 4:
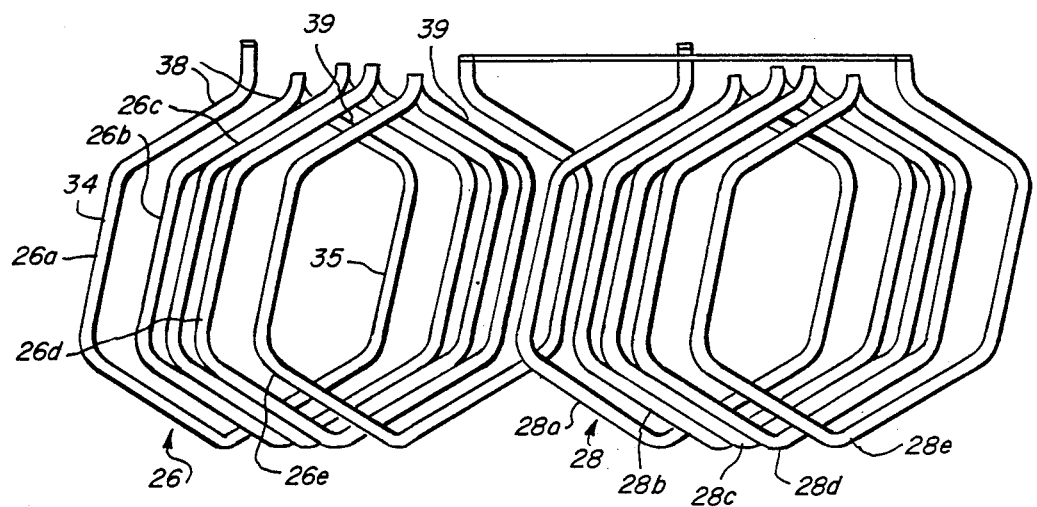
FIG. 4 is a winding roll-out view of a single phase, interdispersed armature winding.

A winding roll-out view of a two-pole single phase interdispersed armature winding according to the invention is illustrated in FIG. 4. As can be seen, the end connections 38 which span nine of the slots 22 are longer than the end connections 38 which span only eight of the slots 22 by a distance "d".

Figure 5:
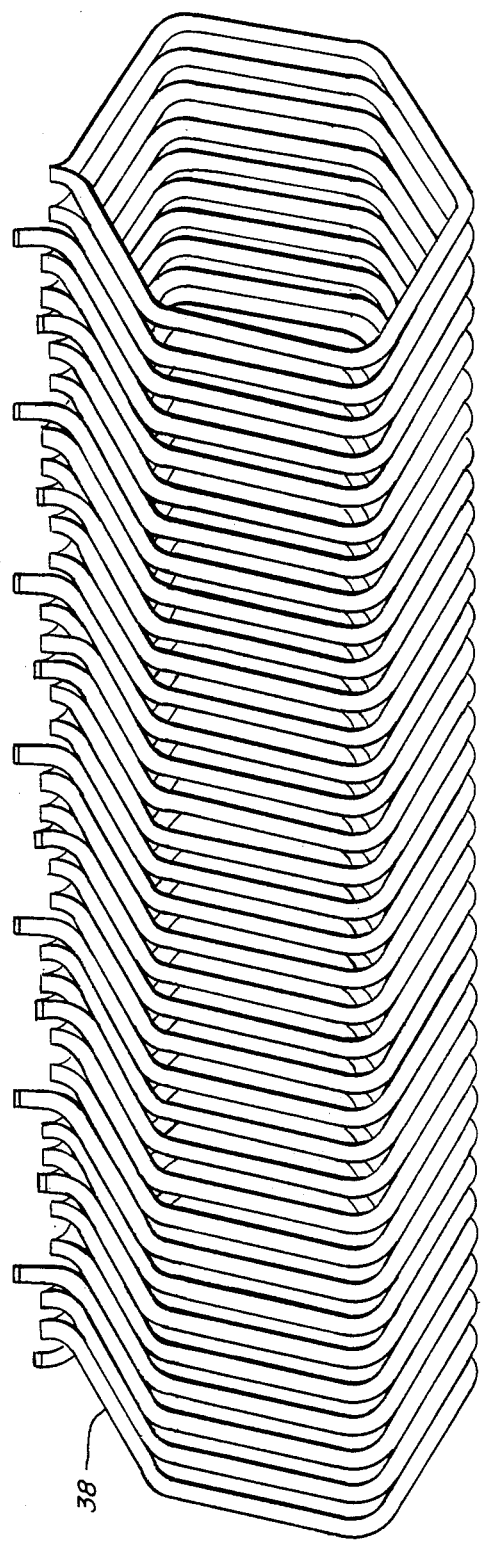
FIG. 5 is a winding roll-out view of a three phase, interdispersed armature winding.

A winding roll-out view of a three phase interdispersed armature winding is illustrated in FIG. 5. The armature winding illustrated in FIG. 5 is similar to that disclosed with respect to FIG. 4, but for the addition of the second and third phases. As with the two pole single phase interdispersed armature winding illustrated in FIG. 4, the end connections 38 which span nine of the slots 22 are longer than the end connections 38 which span only eight of the slots 22.

An isometric view of a single pole of a three phase armature is illustrated in FIG. 7. It can be seen that the end connections 38 of the second and third windings 26b and 26c of the first winding group 26 extend axially outward farther than the end connections 38 of the first and fourth windings 26a and 26d. Thus when the end connections 38 are bent inward prior to final brazing thereof, the end connections 38 spanning the greater number of slots 22 will not interfere with the end connections spanning the fewer number of slots 22.

Additionally, after being bent inward, the end connections 38 occur in predetermined positions. This greatly facilitates automation of the subsequent brazing of the end connections 38.

While applicable to any alternating current machine 10, the invention is especially applicable to a Lundell-Rice generator. As is well known in the art, a Lundell-Rice generator has both a stationary winding and a stationary field coil, the field coil disposed longitudinally outward from the armature winding.

If the end connections 38 are bent outward to make their respective connections, the field coil must be made thinner and, therefore, longer. This longer field coil results in a longer Lundell-Rice generator. By reducing the diameter of the armature winding, the field coil can be made thicker and shorter, reducing the overall length of the Lundell-Rice generator.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. In an alternating current machine comprising an armature core having a plurality of generally longitudinal slots and a plurality of winding groups, each winding group comprising a plurality of one-turn wave windings which are series connected, each winding in each winding group having two generally parallel side portions disposed in non-adjacent slots, said side portions joined at one end by an end turn extending axially outward from one end of said armature core and each of said side portions of each of said windings having an end connection extending a distance axially outward from the other end of said armature core for connecting to a respective end connection of a winding to which each of said winding is series connected, wherein said winding groups are interdispersed about said armature core such that there are a plurality of fixed distances between said windings, the improvement wherein said end connections of each of said winding extend outwardly from said armature core a plurality of distances, and the distance which each of said end connections extends is proportional to the distance between the end connection of each of said windings and the end connection of said winding to which each of said winding is series connected.

2. In a three phase alternating current machine comprising an armature core having a plurality of generally longitudinal slots and at least six winding groups, at least two of said winding groups associated with a respective one of each of said phases to form respective north and south magnetic poles, each winding group comprising a plurality of one-turn windings which are series connected, each of said windings in each of said winding groups having two generally parallel side portions disposed in non-adjacent slots, said side portions joined at one end by an end turn extending axially outward from one end of said armature core and each of said side portions of each of said windings having an end connection extending a distance axially outward from the other end of said armature core for connecting to a respective end connection of an adjacent winding so that said plurality of one-turn windings are series connected, wherein said winding groups are interdispersed. about said armature core such that there are a plurality of fixed distances between said windings, the improvement wherein said end connections of each of said windings extend outwardly from said armature core one of two predetermined distances, and the distance which each of said end connections extends is proportional to the distance between the end connection of each one of said windings and the end connection of said adjacent winding to which each one of said windings is connected to effect a series connection.

3. In a single phase alternating current machine comprising an armature core having a plurality of generally longitudinal slots and an even plurality of winding groups, said winding groups forming respective north and south magnetic poles and each of said winding groups comprising a plurality of one-turn windings which are series connected, each of said windings having two generally parallel side portions disposed in non-adjacent slots, said side portions joined at one end by an end turn extending axially outward from one end of said stator core and each of said side portions of each of said windings having an end connection extending a distance axially outward from the other end of said armature core for connecting to a respective end connection of an adjacent winding to effect a series connection between said plurality of one-turn windings, wherein said winding groups are interdispersed about said armature core such that there are a plurality of fixed distances between said windings, the improvement wherein said end connections of each of said windings extend outwardly from said armature core one of two predetermined distances, and the distance which each of said end connections extends is proportional to the distance between the end connection of each one of said windings and said end connection of said adjacent winding to which each one of said windings is connected to effect a series connection.

4. A one-turn coil for an alternating current machine having an armature core having a plurality of generally longitudinal armature slots and a plurality of winding groups, each winding group comprising a plurality of one-turn wave windings which are series connected, each winding in each of said winding groups having first and second generally parallel side portions disposed in non-adjacent slots, said side portions of each of said windings joined at one end by an end turn extending axially outward from one end of said armature core and having respective first and second end connections each extending a distance axially outward from the other end of said armature core for connecting to a respective end connection of an adjacent winding so that said plurality of windings are series connected, wherein said winding groups are interdispersed about said core such that there are a plurality of fixed distances between said windings, wherein:

said first end connection of each of said windings is a first length as determined by the distance between the slot of said first end connection and the slot of an end connection of said adjacent winding to which said first end connection is series connected; and said second end connection of each of said windings is a second length as determined by the distance between the slot of said second end connection and the slot of an end connection of said adjacent winding to which said second end connection is series connected.

5. The winding of claim 4 wherein said length of said first and second end connections of each of said windings are proportional to the distance between said first end connection and the end connection of said adjacent winding to which said first end connection is series connected, and between said second end connection and the end connection of said adjacent winding to which said second end connection is series connected.

* * * * *